(12) United States Patent
Nakanishi et al.

(10) Patent No.: US 8,423,189 B2
(45) Date of Patent: Apr. 16, 2013

(54) ROBOT SYSTEM AND CONTROL METHOD

(75) Inventors: Mitsuaki Nakanishi, Fukuoka (JP); Makoto Wada, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 812 days.

(21) Appl. No.: 12/538,167

(22) Filed: Aug. 10, 2009

(65) Prior Publication Data

US 2010/0145515 A1    Jun. 10, 2010

(30) Foreign Application Priority Data

Dec. 10, 2008    (JP) ................................ 2008-314492

(51) Int. Cl.
*G05B 19/048*    (2006.01)

(52) U.S. Cl.
USPC ........................................... 700/255; 901/49

(58) Field of Classification Search ................. 700/255; 901/49
See application file for complete search history.

(56) References Cited

U.S. PATENT DOCUMENTS

| | | | |
|---|---|---|---|
| 5,304,906 A | 4/1994 | Arita et al. | |
| 6,057,661 A | 5/2000 | Iwashita | |
| 6,298,283 B1 * | 10/2001 | Kato et al. | 700/255 |
| 6,429,617 B1 * | 8/2002 | Sano et al. | 318/560 |
| 7,102,311 B2 * | 9/2006 | Nishimura et al. | 318/280 |
| 7,102,315 B2 * | 9/2006 | Nakata et al. | 318/568.22 |
| 2006/0090422 A1 * | 5/2006 | McErlean et al. | 53/411 |
| 2006/0178775 A1 * | 8/2006 | Zhang et al. | 700/245 |

FOREIGN PATENT DOCUMENTS

| | | |
|---|---|---|
| JP | 03-104581 | 5/1991 |
| JP | 03-196313 | 8/1991 |
| JP | 06-131050 | 5/1994 |
| JP | 06-245561 | 9/1994 |
| JP | 06-278081 | 10/1994 |
| JP | 11-277483 | 10/1999 |
| JP | 2001-117618 | 4/2001 |
| WO | WO 2005/009692 | 2/2005 |

OTHER PUBLICATIONS

Japanese Office Action for corresponding JP Application No. 2008-314492, Oct. 2, 2012.

* cited by examiner

*Primary Examiner* — Khoi Tran
*Assistant Examiner* — Ryan Rink
(74) *Attorney, Agent, or Firm* — Ditthavong Mori & Steiner, P.C.

(57) ABSTRACT

A robot system includes a robot arm driven by a motor, a collision detector that detects a collision between the robot arm and an obstacle, which is provided on the robot arm, and a stopping method selector that controls the robot arm by selecting any one of all stopping methods on the basis of the information obtained by the collision detector, thereby selecting a stopping method in accordance with the status of the collision.

13 Claims, 3 Drawing Sheets

ROBOT SYSTEM AND CONTROL METHOD

CROSS REFERENCES TO RELATED APPLICATIONS

The present application is related to Japanese Patent application no. 2008-314492 filed at Japan Patent Office titled "ROBOT SYSTEM AND CONTROL METHOD", all of which are incorporated herein by reference.

BACKGROUND OF THE INVENTION

1. Field of the Invention

The present invention relates to a method of controlling a servo motor and a method of controlling a robot system when an abnormal load due to a collision with an object is detected.

2. Discussion of the Background

When an arm constituting an industrial robot or an end effector gripped by such an arm collides with an obstacle, a servo motor that continuously drives each arm, during abnormal load detection in response to a given movement command, causes the servo motor to be locked and to produce a large torque. If this situation lasts for an extended period of time, damage to a mechanical arm section including the servo motor and a reduction gear may result. Also, mechanical damage to the obstacle may result.

There have been proposed, for example, five methods described in the following documents for detecting the occurrence of a collision and immediately suspending a movement command issued to the servo motor; Japanese Unexamined Patent Application Publication No. 6-131050, Japanese Unexamined Patent Application Publication No. 3-196313, Japanese Unexamined Patent Application Publication No. 6-245561, Japanese Unexamined Patent Application Publication No. 6-278081, and International Publication WO 2005/009692.

When encountering a collision with an obstacle, the robot system proposed in the above documents can reduce a collision torque by switching its operation mode to a flexible control mode so as to behave in accordance with the strength of a collision force if the rotational direction of a motor is the same as the direction of the collision torque. However, such a switch to the flexible control mode may cause the robot to go out of control, and the robot and the obstacle are subjected to a great impact force if the robot has large inertia at the time of the collision. In particular, if the servo motor driving the robot around the fundamental axis is running at a high speed at the time of the collision, the switch to the flexible control mode causes the robot to move a large distance until its inertia becomes zero, which may cause another collision, resulting in significant mechanical damage to the robot and the obstacle. Also, if all of the joints used in the robot are subjected to the flexible control, the robot largely deviates from a commanded trajectory. For this reason, when operated again after the detection of the collision, the robot moves through a trajectory other than that commanded at the time of teaching, which may cause a collision with an obstacle.

SUMMARY OF THE INVENTION

Accordingly, it is an object of the present invention to provide a method of stopping a robot that minimizes mechanical damage to the robot and an obstacle by selecting a method for stopping movement around a wrist axis and fundamental axis. The selection depends on the axis a collision is detected for, the rotational direction of a motor and the direction of a collision torque, and a motor speed when a servo motor or a multi-jointed robot having such a servo motor collides with an obstacle. It is another object of the present invention to provide a return method for avoiding another collision when the robot is operated again following the detection of the collision.

According to one aspect of the present invention, a robot system includes a robot arm driven by a motor, a collision detector for detecting collision of the robot arm with an obstacle, and a stopping method selector for selecting a stopping method from among a plurality of stopping methods on the basis of the information obtained by the collision detector, thereby selecting a stopping method depending on the status of the collision.

According to another aspect of the present invention, a robot system control method includes the steps of controlling the robot arm by controlling the motor when a collision is detected during an operation of the robot arm and causing the stopping method selector to stop the robot arm by any one of all stopping methods.

According to a further aspect of the present invention, the robot system control method includes the steps of controlling a robot arm by controlling a servo motor when a collision is detected during an operation of the robot arm and storing the positional data given at the moment of the detection of the collision. The robot system control method further includes the steps of moving all parts of the robot arm around respective axes at a low speed to the positions the parts were at when the collision occurred and operating the robot system again if required.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
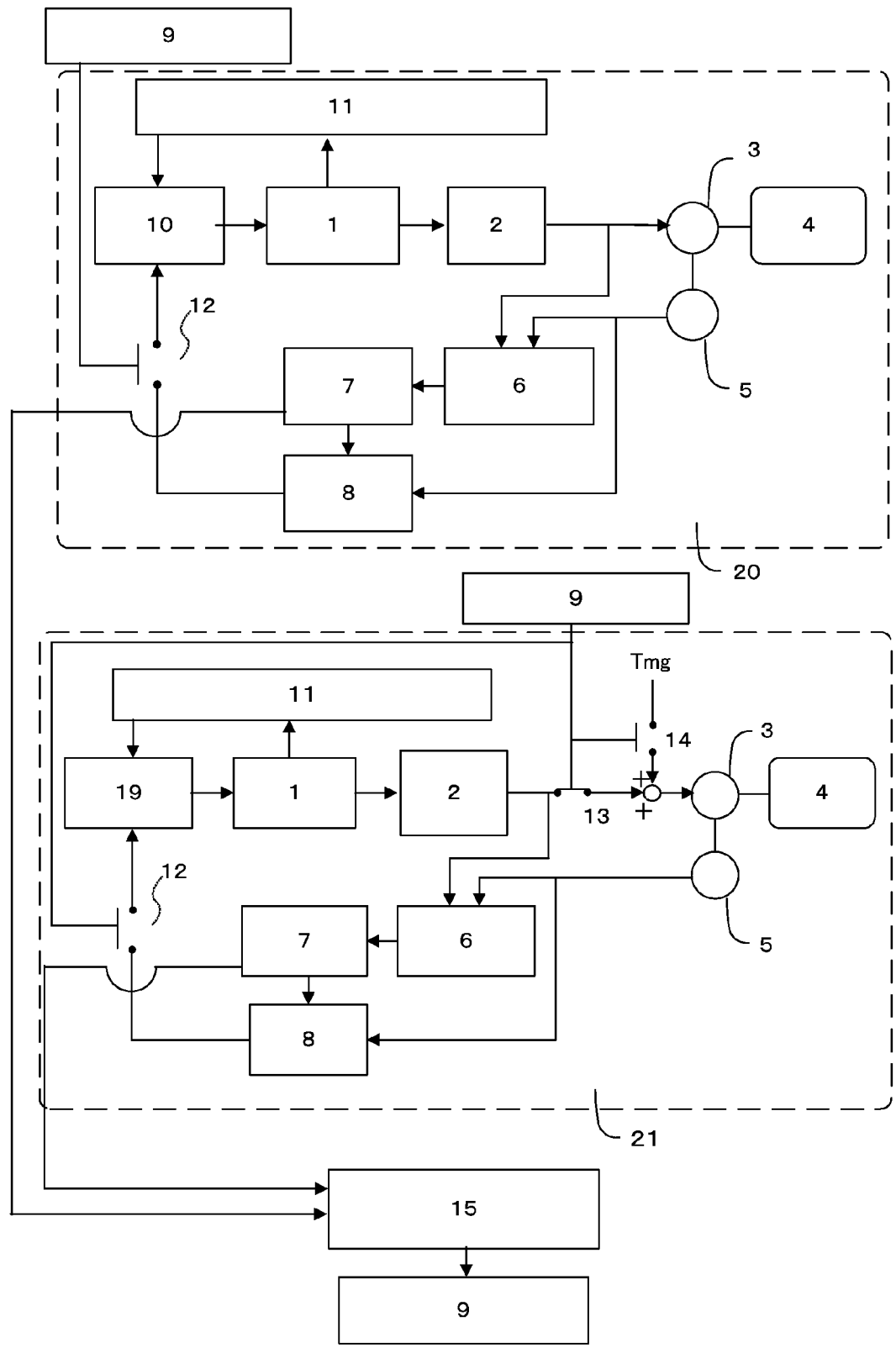
FIG. 1 is a block diagram according to an embodiment of the present invention.

Embodiments will now be described with reference to the accompanying drawings, wherein like reference numerals designate corresponding or identical elements throughout the various drawings.

FIG. 1 is a block diagram showing a servo motor drive system using the collision detector of the present invention. The servo motor drive system includes N joints and each joint has a corresponding collision detector. The system also includes a fundamental axis control block 20 and a wrist axis control block 21.

Figure 3:
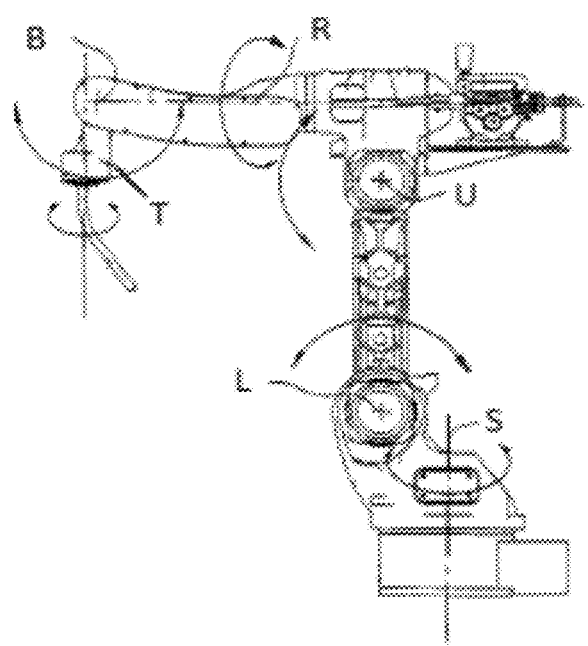
FIG. 3 is a conventional robot arm.

A robot arm for a typical industrial robot uses six-axes control as disclosed in, for example, Japanese Unexamined Patent Application Publication No. 2007-326151, and which is shown in FIG. 3 herein, in which an S-axis, an L-axis, and a U-axis for controlling posture of the robot arm are called fundamental axes, and an R-axis, a B-axis, and a T-axis for controlling posture of an end of the robot arm are called wrist axes.

In the block diagram, a position command generator 1 outputs a position command requested for proper operation of an industrial robot. A control section 2 performs proportional control in response to a position command issued from the position command generator 1 and performs proportional-plus-integral control with respect to a speed, thereby issuing a torque command. A servo motor 3 runs on a current supplied by the control section 2. A robot arm 4 serves as a controlled object driven by the plurality of servo motors 3. An encoder 5 detects the position of the servo motor 3. A collision detector 6 receives a torque command output from the control section 2 and a rotation signal output from the encoder 5 provided on the servo motor 3, thereby estimating a disturbance to which the robot arm 4 is subjected. The collision detector 6 has a disturbance estimation observer that estimates a disturbance acting on the robot arm 4 on the basis of the motor torque and the rotational position of the servo motor 3. A collision detection device monitor 7 determines that a collision has occurred when such an estimated disturbance torque exceeds a specified value. If the collision detection device monitor 7 determines that a collision has occurred, a method for stopping the robot is selected by stopping method selection processing 15. Subsequently, in accordance with such a selected method, the robot is stopped by robot stopping processing 9.

Figure 2:
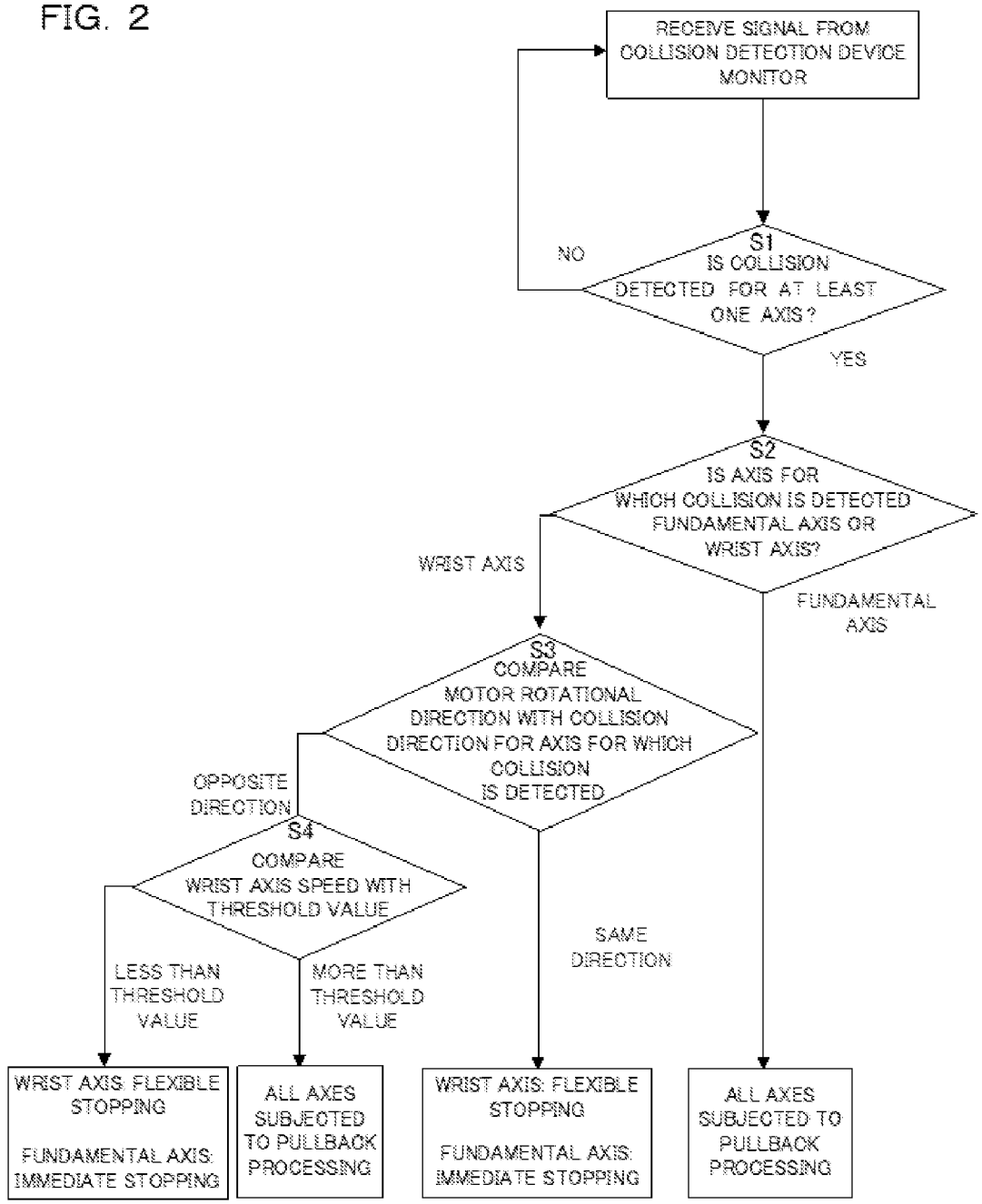
FIG. 2 is a flowchart according to an embodiment of the present invention.

The stopping method selection processing is described below with reference to FIGS. 1 and 2. The collision detector 6 receives a torque command output from the control section 2 and a rotation signal output from the encoder 5 and causes the disturbance estimation observer to estimate a disturbance to which the robot arm 4 is subjected. The collision detection device monitor 7 makes a comparison between such an estimated disturbance and the specified value. For all of the N joints, if all estimated disturbances are lower than those of corresponding specified values, the robot operates in accordance with a command issued by the position command generating device 1. In step S1, if any one of the N joint axes has a disturbance equal to or greater than the specified value, the collision detection device monitor 7 determines that a collision has occurred, and the flow proceeds to step S2.

If the collision detection device monitor 7 determines that a collision has occurred, a method for stopping the robot is selected in step S2. If a collision occurred around a fundamental axis, which was detected by the collision detection device monitor 7, the movement around all joints is stopped by a pullback method. If a joint judged by the collision detection device monitor 7 to have sustained a collision is a wrist axis, the flow proceeds to step S3.

In step S3, for an axis for which a collision has been detected, a comparison is made between a motor rotational direction and a direction of a torque generated by the collision, that is, collision torque acting on the servo motor. The flow proceeds to step S4 if the motor rotational direction is found to be opposite to the direction of the collision torque. The direction of the collision torque is indicated by a sign of the disturbance estimated by the collision detection device 6.

If an axis for which a collision has been detected is a wrist axis and the motor rotational direction is the same as the direction of the collision torque, then the movement around the wrist axis is stopped by flexible stopping processing, while that of the fundamental axis is stopped by immediate stopping processing.

In step S4, a comparison is made between a rotational speed of a servo motor driving the arm around a wrist axis when the collision occurred and a predetermined rotational speed. If the rotational speed of the servo motor for the wrist axis is equal to or greater than the specified value, the robot stops all its movements around all the joint axes including the fundamental axes and the wrist axes by pullback processing.

If an axis for which a collision is detected is a wrist axis and the motor rotational direction is opposite to the direction of the collision torque, and the rotational speed of the servo motor for the wrist axis is not greater than the specified value, then the movement around the wrist axis is stopped by the flexible stopping processing, while that of the fundamental axis is stopped by the immediate stopping processing.

The robot stopping method can be selected in accordance with an axis for which a collision is detected, a servo motor rotational direction just before a collision, the direction of collision torque, or a servo motor speed. The pullback stopping, the flexible stopping, and the immediate stopping processing are described below.

The pullback processing is described with reference to FIG. 1. The position command generator 1 outputs data on position commands for respective drive axes required for proper operation of the robot arm 4. The control section 2 performs proportional control in response to a position command issued from the position command generator 1 and performs proportional-plus-integral control with respect to a speed, thereby issuing a torque command. The servo motor 3 runs on a current supplied by the control section 2, causing the robot arm 4 to operate. A position memory buffer 8 stores data on a current position of the servo motor 3 read from the encoder 5. The collision detector 6 estimates a disturbance that the robot arm 4 is subjected to. The collision detection device monitor 7 makes a comparison between such an estimated disturbance and the specified value and determines that a collision has occurred if any one of the joints has a disturbance equal to or greater than the specified value. If a joint judged to have sustained a collision is associated with a fundamental axis, pullback processing is selected by the stopping method selection processing 15, and a switch 12 is closed by the robot stopping processing 9, which initiates the pullback processing, causing all movements around the joints of the robot to be stopped by the pullback processing. Alternatively, if an axis for which a collision is detected is a wrist axis and the motor rotational direction is opposite to the direction of the collision torque and the rotational speed of the servo motor for the wrist axis is equal to or greater than the specified value, then the pullback processing is selected by the stopping method selection processing 15, and the switch 12 is closed by the robot stopping processing 9, which initiates the pullback processing, causing all movements around the joints including the fundamental axes and the wrist axes to be stopped by the pullback processing.

Selection of the pullback processing by the stopping method selection processing 15 in FIG. 1 determines a pullback position and a pullback speed on the basis of the positional data stored in the position memory buffer 8. The oldest data stored in the memory buffer is set as the pullback position. Of the M pieces of the positional data stored in the memory buffer in advance, the oldest data shows the most distant position from the collided obstacle. The pullback distance θk is calculated from the data on pullback position θk1 and the position θk2 of the servo motor k3 at the time of detection of a collision using Equation 1:

$$\theta k = \theta k1 - \theta k2 \quad (1)$$

The memory buffer has data recorded at constant intervals of time. Assuming the length of the interval is T, the pullback velocity Vk is calculated from the pullback distance θk, the interval T at which data is stored in the position memory buffer, and the number of pieces of data M to be stored in the position memory buffer using Equation 2:

$$Vk = \theta k/(T*M) \quad (2)$$

Equation 2 gives the pullback velocity, which shows that higher servo motor speeds just before the collision result in higher pullback speeds and longer pullback distances, while lower servo motor speeds result in lower pullback speeds and shorter pullback distances.

Data of the position θk2 of the servo motor k3 at the time of detection of a collision and the pullback velocity Vk are output to a position command changing device k9. Upon receipt of the data on the position θk2 of the servo motor k3 at the time of detection of a collision and the pullback velocity Vk from the position memory buffer k8, the position command changing device k9 obtains data of a commanded position θkr using Equation 3 and outputs it to a position command generator k1.

$$\theta kr = \theta k2 + (Vk*Tr*I) \ (I=1, 2 \ldots, T*M/Tr) \quad (3)$$

Here, Tr is an update period of the position command. Using Equation 3, the position command changing device k9 calculates the commanded position θkr by increasing I one by one from 1 to T*M/Tr for each update period Tr of the position command and outputs the calculated data to the position command generator k1. When the number of update events for the position command is T*M/Tr, the commanded position θkr corresponds to the position θk1. By updating the position command toward θk1 from θk2, a torque in the opposite direction from that just before the collision is produced in the servo motor, which moves the robot away from the obstacle. Higher servo motor speeds just before the collision result in higher pullback speeds and longer pullback distances, while lower servo motor speeds result in lower pullback speeds and shorter pullback distances.

If the rotational speed of a servo motor at the time of a collision is high, the distance by which the robot overruns becomes long. In order to sufficiently pull back the robot from the obstacle, the distance of pullback is needed to be increased. Also, since the degree of damage that the robot and the obstacle sustain is proportional to the speed at the time of the collision, the pullback speed is needed to be increased in proportion to the speed.

The degree of damage that the robot and the obstacle sustain is proportional to the speed at the time of the collision. This embodiment allows the pullback speed to be determined in proportion to the speed of the servo motor following the detection of a collision at that time, thereby minimizing the degree of damage that the robot and the obstacle sustain. The distance of pullback increases in proportion to the speed of the servo motor at the time of the collision, ensuring that the robot arm is sufficiently pulled back from the obstacle.

If an axis for which a collision is detected is a fundamental axis, the robot arm moving around all of the axes are pulled back and stopped, irrespective of the motor rotational direction and the direction of the collision torque. If the motor rotational direction is the same as the direction of the collision torque, an attempt is made to switch the operational mode to the flexible control mode to cause the arm moving around the fundamental axis to move in accordance with a collision in order to reduce the collision torque. However, since the arm of the robot moving around the fundamental axis has greater inertia than other parts moving around the wrist axis, if the robot is subjected to flexible stopping processing, the robot moves a large distance after a collision is detected. This poses a concern over recurrence of a collision. Accordingly, if a collision is detected for a fundamental axis, regardless of the motor rotational direction and the direction of the collision torque, the all-axis pullback stopping processing is less likely to lead to recurrence of a collision than the flexible processing. Also, the pullback stopping processing pulls back the robot to its trajectory. For this reason, when operated again after the pullback stopping processing, the robot moves along a trajectory instructed at the time of teaching, thereby preventing a collision from recurring.

If an axis for which a collision is detected is a wrist axis and the motor rotational direction of the servo motor driving thereof is opposite to the direction of the collision torque and a rotational speed of the servo motor at the time of the collision is equal to or greater than the specified value, then the rotational speed of the motor is reduced by causing the motor to produce a torque in the opposite direction to the motor rotational direction because the parts moving around the wrist axis has a greater inertia torque. Thereby collision energy is reduced so that damage to the robot and the obstacle can be minimized. Also, the pullback stopping processing pulls back the robot to the desired trajectory. Due to this, when operated again after the pullback stopping processing, the robot moves along a trajectory instructed at the time of teaching, thereby preventing a collision from recurring.

Then, the flexible stopping processing for the wrist axis and the immediate stopping processing for the fundamental axis are described below. If an axis for which a collision is detected is a wrist axis and the motor rotational direction is the same as the direction of the collision torque, then the movement around the wrist axis is stopped by the flexible stopping processing, while the movement around the fundamental axis is stopped by the immediate stopping processing. Alternatively, if an axis for which a collision is detected is a wrist axis and the servo motor rotational direction is opposite to the direction of the collision torque and the rotational speed of the servo motor for the wrist axis at the time of the collision is not greater than the specified value, then the movement around the wrist axis is stopped by the flexible stopping processing, while the movement around the fundamental axis is stopped by the immediate stopping processing.

The control system for the wrist axis in the case where the flexible stopping processing is selected is described below with reference to FIG. 1. The collision detector 6 estimates a disturbance that the robot arm 4 sustains. The collision detection device monitor 7 makes a comparison between such an estimated disturbance and the specified value. If any one joint has a disturbance equal to or greater than the specified value, the collision detection device monitor 7 determines that a collision has occurred. If a flexible stopping processing is selected by the stopping method selection processing 15, a switch 13 is opened after a collision is detected, causing a torque command value obtained from the control section 2 to be forcibly set to 0. A switch 14 is closed to prevent the arm from falling due to the gravitational force, and a gravity compensation value is added to a torque command value to the servo motor 3. Such a gravity compensation value is obtained in advance by calculation based on the posture of the robot arm 4 and weight parameters or by measurement. This allows the robot arm moving around the wrist axis to move in accordance with a collision. Also, the switch 13 is opened and the switch 14 is closed when a collision is detected, and at the same time a position command output from the position command generator 1 at the moment of detection of a collision is output to a return position storage device 11.

The control system for the fundamental axis in the case where the immediate stopping processing is selected is described below using FIG. 1. When the immediate stopping processing is selected by the stopping method selection processing 15, a switch 12 is closed by the robot stopping processing 9, which enables the immediate stopping processing. The position memory buffer 8 stores a current position of the servo motor 3 read from the encoder 5. The collision detector 6 estimates a disturbance that the robot arm 4 sustains. The collision detection device monitor 7 makes a comparison between such an estimated disturbance and the specified value and determines that a collision has occurred if any one of the joint axes has a disturbance equal to or greater than the specified value. When the immediate stopping processing is selected by the stopping method selection processing, a stopping position is determined on the basis of the positional data stored in the position memory buffer. The latest positional data of all the data recorded in the position memory buffer 8 at the moment of detection of a collision is treated as a stopping position. Since the memory buffer 8 contains M pieces of predetermined positional data, the latest data represents a position at which a collision is detected. The latest positional data of all the data recorded in the position memory buffer 8 is output to the position command changing device 9. The servo motor 3 produces a torque in the opposite direction from that just before the collision, which moves the robot arm 4 to a position at which the collision is detected. A position command output from the position command generator 1 at the moment of detection of the collision is output to a return position storage device 11.

The wrist axis flexible stopping processing and the fundamental axis immediate stopping processing are selected by the stopping method selection processing 15 in the following case; an axis for which a collision is detected is a wrist axis and the motor rotational direction is the same as the direction of the collision torque; and an axis for which a collision is detected is a wrist axis and the motor rotational direction is opposite to the direction of the collision torque and the rotational speed of the servo motor for the wrist axis at the time of a collision is not greater than the specified value. If an axis for which a collision is detected is a wrist axis and the motor rotational direction is the same as the direction of the collision torque, the arm moving around the wrist axis is subjected to the flexible stopping processing. This causes the arm moving around the wrist axis to move in accordance with a collision, reducing a collision torque. At this time, it is conceivable that an arm moving around the fundamental axis is also subjected to the flexible stopping processing. However, if the arm moving around the fundamental axis having greater inertia than that moving around the wrist axis is subjected to the flexible stopping processing, the robot moves a large distance after a collision is detected. That poses a concern over recurrence of a collision. A robot moving around the fundamental axis is subjected to the immediate stopping processing, instead of the flexible stopping processing, which causes the robot to move to a position at which a collision is detected.

After subjected to the wrist axis flexible stopping processing or the fundamental axis immediate stopping processing, the robot moving around the wrist axis goes out of control and deviates from the commanded trajectory. When operated again after stopped, the robot arm moves through a trajectory different from that commanded at the time of teaching and is likely to collide with an obstacle. For this reason, if a requirement for an operation of the robot is made again, in order to avoid another collision, before the operation, all parts of the robot arm around respective axes are returned at a low speed to positions for which data are stored in a return position data storage device 11. Since all position data stored in the return position data storage device 11 correspond to those of the commanded trajectory, it is less likely that another collision with an obstacle will be caused. Also, even if the robot arm sustains another collision on the way back to the commanded trajectory, mechanical damages to the robot arm and the obstacle can be minimized since the robot arm is returned at a low speed to the commanded trajectory.

If an axis for which a collision is detected is a wrist axis and the motor rotational direction is opposite to the direction of the collision torque and the rotational speed of the servo motor at the time of the collision for moving the robot around the wrist axis is not greater than the specified value, then the movement around the wrist axis is flexibly stopped, while the movement around the fundamental axis is immediately stopped. If an axis for which a collision is detected is a wrist axis and the rotational speed of the servo motor at the time of the collision for moving the robot around the wrist axis is not greater than the specified value, then mechanical damages to the robot and the obstacle are minimized due to low inertia of the wrist axis. Accordingly, the movement around the wrist axis is subjected to flexible stopping instead of a pullback operation. This allows the movement around the wrist axis to move in accordance with an external force, expeditiously eliminating distortion that reduction gears suffer from at the time of a collision. If a requirement for an operation of the robot is made again, in order to avoid another collision, before the operation, all parts of the robot arm around respective axes are returned at a low speed to positions for which data are stored in the return position storage device 11. Since all position data stored in the return position data storage device 11 correspond to those of the commanded trajectory, it is less likely that another collision with an obstacle will be caused. Also, even if the robot arm sustains another collision on the way back to the commanded trajectory, mechanical damages to the robot arm and the obstacle can be minimized since the robot arm is returned at a low speed to the commanded trajectory.

What is claimed is:

1. A robot system comprising:
   a robot arm driven by a motor;
   a collision detector that detects a collision between the robot arm and an obstacle; and
   a stopping method selector that controls the robot arm by selecting a stopping method from among a plurality of stopping methods on the basis of the information obtained by the collision detector,
   wherein the stopping method selector selects the stopping method on the basis of the information obtained by the collision detector and information indicating at which joint axis of the robot arm the collision is detected,
   wherein, when the joint axis for which the collision is detected is a fundamental axis, the stopping method selector causes all parts of the robot arm moving around respective axes to be pulled back upon detection of the collision, and
   wherein, when the joint axis for which the collision is detected is a wrist axis, the stopping method selector is configured to cause:
     a part of the robot arm moving around the wrist axis to be stopped by flexible stopping processing and a second part of the robot arm moving around the fundamental axis to be stopped by immediate stopping processing upon detection of the collision, or
     all parts of the robot arm moving around respective axes to be pulled back upon detection of the collision.

2. The robot system according to claim 1, further comprising a return position storing device that allows the robot arm to move to a predetermined position after the robot arm is stopped by any one of the plurality of stopping methods on the basis of the information obtained by the collision detector.

3. The robot system according to claim 2, wherein the return position storing device stores data on a rotational position of the plurality of motors at constant intervals of time.

4. The robot system according to claim 1, wherein the collision detector is provided at each of fundamental and wrist axes of the robot arm.

5. The robot system according to claim 4, wherein the wrist axis of the robot arm is provided with a switching device that compensates for gravity and operates in accordance with a stopping method selected by the stopping method selector.

6. A method of controlling a robot system, comprising the steps of:
   detecting a collision by a collision detector in a robot arm;
   controlling a part of the robot arm by controlling a motor when the collision is detected; and
   causing a stopping method selector to stop the robot arm by using any one of a plurality of stopping methods,
   wherein the stopping method selector selects the stopping method on the basis of the information obtained by the collision detector and information indicating at which joint axis of the robot arm the collision is detected,
   wherein, when the joint axis for which the collision is detected is a fundamental axis, the stopping method selector causes all parts of the robot arm moving around respective axes to be pulled back upon detection of the collision, and
   wherein, when the joint axis for which the collision is detected is a wrist axis, the stopping method selector is configured to cause:
   a part of the robot arm moving around the wrist axis to be stopped by flexible stopping processing and a second part of the robot arm moving around the fundamental axis to be stopped by immediate stopping processing upon detection of the collision, or
   all parts of the robot arm moving around respective axes to be pulled back upon detection of the collision.

7. The method of controlling the robot system according to claim 6, whereby the stopping method selector causes the part of robot arm moving around the wrist axis to be stopped by flexible stopping processing and causes the second part of the robot arm moving around the fundamental axis to be stopped by immediate stopping processing if the axis for which the collision is detected is the wrist axis and the rotational direction of the motor is the same as a direction of the collision torque.

8. The method of controlling the robot system according to claim 6, whereby the stopping method selector causes the part of the robot arm moving around the wrist axis to be stopped by the flexible stopping processing and causes the second part of the robot arm moving around the fundamental axis to be stopped by the immediate stopping processing if the axis for which the collision is detected is the wrist axis and the rotational direction of the motor is opposite to a direction of the collision torque and a servo motor speed for the wrist axis at the time of a collision is not greater than a specified value.

9. The method of controlling the robot system according to claim 6, whereby the stopping method selector causes all parts of the robot arm moving around respective axes to be pulled back if the axis for which the collision is detected is the wrist axis and the rotational direction of the motor is opposite to a direction of the collision torque and a servo motor speed for the wrist axis at the time of the collision is equal to or greater than the specified value.

10. A method of controlling a robot system, comprising the steps of:
    detecting a collision by a collision detector in a robot arm;
    controlling a part of the robot arm by controlling a motor when the collision is detected;
    storing a position command data at the moment of the detection of the collision;
    causing a stopping method selector to stop the robot arm by using any one of a plurality of stopping methods; and
    returning all parts of the robot arm moving around respective axes at a low speed to the position for which the position command data are stored before causing the robot arm to be operated again when a requirement for an operation of the robot arm is made,
    wherein the stopping method selector selects the stopping method on the basis of the information obtained by the collision detector and information indicating at which joint axis of the robot arm the collision is detected,
    wherein, when the joint axis for which the collision is detected is a fundamental axis, the stopping method selector causes all parts of the robot arm moving around respective axes to be pulled back upon detection of the collision, and
    wherein, when the joint axis for which the collision is detected is a wrist axis, the stopping method selector is configured to cause:
    a part of the robot arm moving around the wrist axis to be stopped by flexible stopped processing and a second part of the robot arm moving around the fundamental axis to be stopped by immediate stopping processing upon detection of the collision, or
    all parts of the robot arm moving around respective axes to be pulled back upon detection of the collision.

11. The robot system according to claim 1, wherein, when the joint axis for which the collision is detected is a wrist axis, the stopping method selector is further configured to select the stopping method on the basis of a relationship between the collision torque and the rotation direction of the motor for the wrist axis for which the collision is detected.

12. The method of controlling the robot system according to claim 6, wherein, when the joint axis for which the collision is detected is a wrist axis, the stopping method selector selects the stopping method on the basis of a relationship between the collision torque and the rotation direction of the motor for the wrist axis for which the collision is detected.

13. The method of controlling the robot system according to claim 10, wherein, when the joint axis for which the collision is detected is a wrist axis, the stopping method selector selects the stopping method on the basis of a relationship between the collision torque and the rotation direction of the motor for the wrist axis for which the collision is detected.

* * * * *